United States Patent
Kang et al.

(10) Patent No.: US 11,205,797 B2
(45) Date of Patent: Dec. 21, 2021

(54) METHOD FOR MANUFACTURING NEGATIVE ELECTRODE FOR LITHIUM SECONDARY BATTERY

(71) Applicant: LG CHEM, LTD., Seoul (KR)

(72) Inventors: Yoonah Kang, Daejeon (KR); Eun Kyung Kim, Daejeon (KR); Sangwook Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 51 days.

(21) Appl. No.: 16/466,585

(22) PCT Filed: Apr. 26, 2018

(86) PCT No.: PCT/KR2018/004883
§ 371 (c)(1),
(2) Date: Jun. 4, 2019

(87) PCT Pub. No.: WO2018/208034
PCT Pub. Date: Nov. 15, 2018

(65) Prior Publication Data
US 2020/0075989 A1 Mar. 5, 2020

(30) Foreign Application Priority Data

May 12, 2017 (KR) ........................ 10-2017-0059603
Apr. 25, 2018 (KR) ........................ 10-2018-0048075

(51) Int. Cl.
*H01M 10/052* (2010.01)
*H01M 4/04* (2006.01)
(Continued)

(52) U.S. Cl.
CPC ........... *H01M 10/052* (2013.01); *H01M 4/04* (2013.01); *H01M 4/1391* (2013.01); *H01M 4/38* (2013.01);
(Continued)

(58) Field of Classification Search
None
See application file for complete search history.

(56) References Cited

U.S. PATENT DOCUMENTS 6,761,744 B1 * 7/2004 Tsukamoto ............. H01M 4/13
29/623.3
2005/0244715 A1 * 11/2005 Cho ........................ H01M 4/13
429/246

(Continued)

FOREIGN PATENT DOCUMENTS

CN 1694298 A 11/2005
CN 101145621 A 3/2008
(Continued)

OTHER PUBLICATIONS

Extended European Search Report dated Dec. 9, 2019, for European Application No. 18797746.7.
(Continued)

*Primary Examiner* — Ula C Ruddock
*Assistant Examiner* — Thomas H. Parsons
(74) *Attorney, Agent, or Firm* — Birch, Stewart, Kolasch & Birch, LLP

(57) ABSTRACT

A method for manufacturing a negative electrode for a lithium secondary battery. A negative electrode for a lithium secondary battery is manufactured while forming a composite of lithium metal and a negative electrode active material through a rolling process In the case of the lithium secondary battery to which the negative electrode containing such a composite is applied, when the battery starts to operate, the negative electrode active material is pre-lithiated, and thus charging/discharging process proceeds in the state where the lithium alloy is already formed on the negative electrode, thereby showing an effect of reducing initial irreversible phases.

11 Claims, 1 Drawing Sheet

(51) Int. Cl.
- *H01M 4/1391* (2010.01)
- *H01M 4/38* (2006.01)
- *H01M 4/485* (2010.01)
- *H01M 4/62* (2006.01)
- *H01M 4/133* (2010.01)

(52) U.S. Cl.
CPC ............ *H01M 4/485* (2013.01); *H01M 4/62* (2013.01); *H01M 4/133* (2013.01)

(56) References Cited

U.S. PATENT DOCUMENTS

| | | | | |
|---|---|---|---|---|
| 2007/0020522 | A1* | 1/2007 | Obrovac | H01M 4/38 |
| | | | | 429/218.1 |
| 2008/0057385 | A1 | 3/2008 | Aramata et al. | |
| 2008/0070120 | A1 | 3/2008 | Miyawaki et al. | |
| 2008/0292942 | A1 | 11/2008 | You et al. | |
| 2013/0034759 | A1* | 2/2013 | Funada | H01M 10/0525 |
| | | | | 429/90 |
| 2013/0326865 | A1* | 12/2013 | Kobayashi | H01M 4/0435 |
| | | | | 29/623.1 |
| 2014/0079872 | A1* | 3/2014 | Uchida | H01M 10/0525 |
| | | | | 427/58 |
| 2014/0154576 | A1* | 6/2014 | Kang | H01M 10/0427 |
| | | | | 429/222 |
| 2015/0194680 | A1 | 7/2015 | Uchida | |
| 2015/0333385 | A1 | 11/2015 | Sun et al. | |
| 2015/0357628 | A1 | 12/2015 | Li et al. | |

FOREIGN PATENT DOCUMENTS

| | | | |
|---|---|---|---|
| CN | 101233631 | A | 7/2008 |
| CN | 103959516 | A | 7/2014 |
| CN | 105215633 | * | 1/2015 |
| CN | 104620423 | A | 5/2015 |
| CN | 105215633 | A * | 1/2016 |
| JP | 2007-214109 | A | 8/2007 |
| JP | 2008-98151 | A | 4/2008 |
| JP | 2010-199022 | A | 9/2010 |
| JP | 2012-33907 | A | 2/2012 |
| JP | 2013-73928 | A | 4/2013 |
| JP | 2015-502025 | A | 1/2015 |
| JP | 2016-25060 | A | 2/2016 |
| JP | WO 2013/187176 | A1 | 2/2016 |
| JP | 2016-146232 | A | 8/2016 |
| JP | 2016-1625138 | A | 9/2016 |
| JP | 2017-37716 | A | 2/2017 |
| KR | 10-2001-0037099 | A | 5/2001 |
| KR | 10-0590096 | B1 | 6/2006 |
| KR | 10-2008-0020530 | A | 3/2008 |
| KR | 10-2008-0102938 | A | 11/2008 |
| KR | 10-2014-0032577 | A | 3/2014 |
| KR | 10-1397415 | B1 | 5/2014 |
| KR | 10-2014-0070406 | A | 6/2014 |
| KR | 10-2014-0078173 | A | 6/2014 |
| KR | 10-1637068 | B1 | 7/2016 |

OTHER PUBLICATIONS

International Search Report issued in PCT/KR2018/004883 (PCT/ISA/210), dated Aug. 24, 2018.

\* cited by examiner

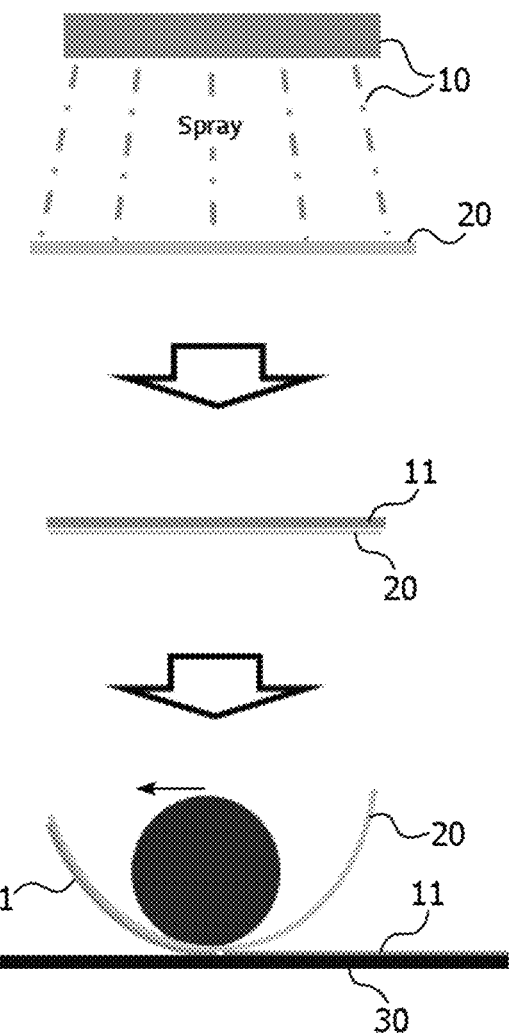

METHOD FOR MANUFACTURING NEGATIVE ELECTRODE FOR LITHIUM SECONDARY BATTERY

TECHNICAL FIELD

The present application claims the benefit of Korean Patent Application No. 10-2017-0059603 filed on May 12, 2017, and Korean Patent Application No. 10-2018-0048075 filed on Apr. 25, 2018, all the contents of which are incorporated herein by reference.

The present invention relates to a method of manufacturing a negative electrode capable of reducing the initial irreversible phase of a lithium secondary battery.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely. Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity, density and specific energy.

Among the secondary batteries currently being applied, the lithium secondary batteries developed in the early 1990s are attracting much attention as there is an advantage in that it has much higher operating voltage and energy density than conventional batteries such as Ni-MH, Ni—Cd, and sulfuric acid-lead batteries using an electrolyte solution in the form of an aqueous solution. However, among them, the lithium ion secondary batteries have safety problems such as ignition and explosion by using an organic electrolyte solution and have a drawback that it is difficult to manufacture. The recently developed lithium polymer secondary batteries have been recognized as one of the next generation batteries by improving the weak point of these lithium ion secondary batteries, but they are still relatively low in battery capacity compared to lithium ion secondary batteries and in particular are inadequate in terms of discharge capacity at the low temperature, and thus are urgently required to improve these disadvantages.

For this purpose, there is an increasing need for a negative electrode material having high capacity, and accordingly metalloid materials such as Si or Sn based materials having a large theoretical capacity have been applied as a negative electrode active material. In particular, since the Si-based material has a capacity (4190 mAh/g) which is at least 11 times higher than the theoretical capacity (372 mAh/g) of the carbon-based negative electrode active material, it is attracting attention as a substitute for the carbon-based negative electrode active material. However, in the case of these negative electrode active materials, they are degraded in cycle characteristics as the charging and discharging are repeatedly performed, and since the volumetric expansion when inserting lithium ion is at least 3 times, the battery capacity tends to decrease as the charging/discharging proceeds, and safety problems also arise and thus it is necessary to develop many technologies in order to commercialize them.

Therefore, there is undergoing research to reduce cycle characteristics and volumetric expansion by using metalloid oxides such as silicon oxide ($SiO_x$). Among them, the results of the study using Si-based materials and carbon-based materials simultaneously as a Si-based composite is a method developed to simultaneously increase the capacity and the charging/discharging lifetime by minimizing the volumetric expansion of the silicon-based material. The synthesis method of the most basic composite is achieved by coating carbon on the silicon-based material. This leads to an increase in battery life due to the improvement of the electrical conductivity between the particles of active materials and the electrochemical property for the electrolyte and reduction of volumetric expansion of silicon-based particles, but there is a problem that the initial charging/discharging efficiency is lowered due to the formation of irreversible phases by the silicon-based material during the initial charging/discharging.

In order to compensate for this, if metalloid oxide and lithium are pre-composited in advance so that metalloid oxide contains lithium, the irreversible phases such as lithium oxide and lithium metal oxide are less generated during the initial charging/discharging of the battery, and thus the initial efficiency of the negative electrode active material can be increased.

PRIOR ART DOCUMENT

Patent Document (Patent Document 1) Korean Patent Publication No. 10-1637068, "Composite for anode active material and manufacturing method thereof."

DISCLOSURE

Technical Problem

Therefore, in order to solve the above-mentioned problems, a negative electrode having a composite which is formed by lithium and a negative electrode active material, for example, lithium and a metalloid oxide in a negative electrode active material layer was prepared in the present invention, and it has been confirmed that in the case of the lithium secondary battery to which the negative electrode having such a composite of lithium and negative electrode active material is applied, lithium and metalloid oxide can be pre-lithiated simultaneously with the operation of the battery, thereby minimizing the formation of irreversible phases produced during the initial charging/discharging of the battery.

Accordingly, it is an object of the present invention to provide a method of manufacturing a negative electrode capable of reducing the initial irreversible phases of the lithium secondary battery.

Technical Solution

In order to accomplish the above object, the present invention provides a method for manufacturing a negative electrode for a lithium secondary battery comprising the steps of i) dispersing a lithium metal powder and a binder in a dispersion medium to prepare a lithium dispersion; ii) coating the lithium dispersion on one side of a transfer film to form a coating layer of the lithium metal powder; and iii) bringing the coating layer of the lithium metal powder into contact with a negative electrode active material layer of the negative electrode, followed by rolling to form a composite of lithium metal in the lithium metal powder and negative electrode active material of the negative electrode active material layer.

Advantageous Effects

According to the present invention, when applying the negative electrode, which includes the composite of lithium and the negative electrode active material in the negative electrode active material layer, to the lithium secondary battery, the pre-lithiation in which the negative electrode active material forms an alloy with lithium is proceeded as the battery starts to operate. On this wise, since the charging/discharging is performed in a state where the lithium alloy is generated in advance, the irreversible phases such as lithium oxide and lithium metal oxide can be less generated during the initial charging/discharging of the battery, thereby improving the initial efficiency of the negative electrode active material.

In particular, the negative electrode containing the negative electrode active material which contains a metalloid oxide among the negative electrode active materials includes the composite of lithium and metalloid oxide, thereby further enhancing the effect of preventing the formation of the initial irreversible phases of the lithium secondary battery.

In addition, when the negative electrode prepared by optimizing the conditions of the rolling process for forming the composite of lithium and the negative electrode active material, for example, the rolling strength and the pressing speed, in the negative electrode manufacturing method according to the present invention is applied to the lithium secondary battery, the effect of preventing formation of the initial irreversible phases can be further improved.

In addition, when an additive such as fluoroethylene carbonate (FEC) is added to the electrolyte solution of the lithium secondary battery comprising the negative electrode prepared according to the present invention, the effect of preventing the initial irreversible phase formation of the lithium secondary battery can be further improved.

DESCRIPTION OF DRAWINGS

FIG. 1 is a schematic view showing a method of manufacturing a negative electrode for a lithium secondary battery according to the present invention.

BEST MODE

Hereinafter, the present invention will be described in detail with reference to the accompanying drawings so that those skilled in the art can easily carry out the present invention. However, the present invention can be embodied in various different forms and is not limited thereto.

In the drawings, parts not related to the description are omitted in order to clearly illustrate the present invention, and similar reference numerals are used for similar portions throughout the specification. Also, the size and relative size of the components shown in the FIGURE are independent of the actual scale and may be reduced or exaggerated for clarity of description.

The present invention relates to a method of manufacturing a negative electrode including a composite of lithium and a negative electrode active material. Preferably, the negative electrode active material may include a metalloid oxide, and in that case, the negative electrode may include a composite of lithium and the metalloid oxide. As used herein, the term "metalloid" may refer to a metal or metalloid.

When applying the negative electrode including such a composite to the lithium secondary battery, as the battery starts to operate, lithium and the negative electrode active material, for example, lithium and metalloid oxide, included in the composite form alloys and are therefore pre-lithiated. Therefore, the charging/discharging of the battery is proceeded in the state where the alloy of lithium was generated in advance, and as a result, the irreversible phases such as lithium oxide and lithium metal oxide can be less generated during the initial charging/discharging of the battery, thereby improving the initial efficiency of the negative electrode active material.

FIG. 1 is a schematic view showing a method of manufacturing a negative electrode for a lithium secondary battery according to the present invention. FIG. 1 illustrates a metalloid oxide as a negative electrode active material which forms a composite with lithium, but the present invention is not limited thereto.

Referring to FIG. 1, the present invention specifically provides a method for manufacturing a negative electrode for a lithium secondary battery comprising the steps of i) dispersing a lithium metal powder and a binder in a dispersion medium to prepare a lithium dispersion 10; ii) coating the lithium dispersion 10 on one side of a transfer film 20 to form a coating layer 11 of the lithium metal powder; and iii) bringing the coating layer 11 of the lithium metal powder into contact with one side of a metalloid oxide 30, followed by rolling to form a composite of lithium and the metalloid oxide 30.

Hereinafter, the method for manufacturing the negative electrode for the lithium secondary battery according to the present invention will be described in detail for each step.

i) Lithium Dispersion Preparation Step

First, a lithium metal powder and a binder are dispersed in a dispersion medium to prepare a lithium dispersion.

The lithium metal powder preferably has a particle diameter of exceeding 0 μm to 100 μm or less, more preferably exceeding 0 μm to 50 μm or less. If the particle diameter exceeds 100 μm, there can be a problem that the thickness of the electrode after the transfer becomes thick, and the energy density of the whole battery is lowered.

The binder may be at least one selected from the group consisting of polyvinylidene fluoride-co-hexafluoro propylene (PVDF-co-HFP), polyvinylidene fluoride-co-trichloro ethylene, polyvinylidene fluoride-co-chlorotrifluoro ethylene, polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidenefluoride and styrene butadiene rubber (SBR).

The dispersion medium is not particularly limited, and the dispersion medium which allows the dispersion to be uniform and can be easily removed thereafter is preferable. For example, the dispersion medium may include at least one selected from the group consisting of N-methyl-2-pyrrolidone (NMP), dimethylformamide (DMF), dimethyl acetamide, xylene, heptane, hexane, toluene, acetone, tetrahydrofuran, methylene chloride, chloroform, cyclohexane, dichloromethane, dimethyl sulfoxide, acetonitrile, pyridine, and amines.

The lithium metal powder and the binder are mixed at a weight ratio of 70:30 to 95:5. If the content of the lithium metal powder exceeds the above range, the content of the binder may be relatively decreased, and thus the adhesive force on the transfer film which is the subsequent step may be lowered. On the other hand, if the content of the lithium metal powder is less than the above range, the lithium content may be insufficient in the subsequent alloying step and thus the initial efficiency may be lowered.

In addition, the dispersion medium may be included in an appropriate amount to such an extent as to give the mixture a viscosity and fluidity enough to be spray-dried and coated on a transfer film.

For example, the dispersion medium may be included in an amount of 10 to 40% by weight, preferably 15 to 35% by weight, more preferably 20 to 30% by weight based on the total weight of the lithium dispersion. If the content is less than the above range, the viscosity of the lithium dispersion may increase and the fluidity may be lowered, thereby making the coating difficult. If the content exceeds the above range, the viscosity is decreased and thus the coating process is not easily performed, and also the content of lithium is relatively decreased and thus the pre-lithiation may not be performed well at a later time when the battery is driven.

When the lithium metal powder, the binder and the dispersion medium are mixed to form a lithium dispersion, the lithium metal powder can be dispersed using a dispersing device as known commonly in the art. The dispersing device is not particularly limited as long as it is an apparatus for dispersing a substance to be dispersed in a dispersion medium, and for example, an ultrasonic dispersing device such as a shaker or a stirrer may be used.

ii) Preparation Step of Lithium Metal Powder Coated Transfer Film

Next, the lithium dispersion prepared above is sprayed on a transfer film to coat the lithium metal powder.

As the transfer film, for example, various thermoplastic resins or thermosetting resins can be used, but thermoplastic resins are preferred because of their flexibility. The thermoplastic resin may be selected from the group consisting of polyolefin, polyvinylalcohol-based polymer, polyester, polyamide, polyimide, polycarbonate, polyphenylene ether, polyphenylene sulfide and cellulose derivative. The polyester and polyimide are preferred because they are excellent in balance between heat resistance and flexibility.

The method of coating the prepared lithium dispersion on the separator may preferably be performed by spray drying. The spray drying may substantially remove moisture to form granular powder. The apparatus for performing the spray drying may include, but is not limited to, a drying chamber for substantially performing the spray drying, a hot air inlet tube connected to the drying chamber to supply hot air into the drying chamber to remove the dispersion medium, an air outlet connected to the drying chamber to discharge the cooled air during the spray drying, a raw material injecting tube for passing and spraying the raw material into the drying chamber through the wall constituting the drying chamber, and a powder recovery tube connected to the drying chamber for recovering the powder formed by the spray drying in the drying chamber.

For example, the spraying may be performed by spraying the mixed solution at a rate of 15 to 25 cc/min at an inlet temperature of 200 to 250° C. and an outlet temperature of 60 to 80° C. in the drying chamber of the spray drying apparatus, but is not limited thereto.

iii) Formation Step of Composite of Lithium and Negative Electrode Active Material Next, the lithium metal powder coating layer formed on one side of the transfer film is brought into contact with the negative electrode active material layer, followed by rolling to form a composite of lithium and the negative electrode active material. Preferably, the negative electrode active material may comprise a metalloid oxide.

The metalloid oxide may be at least one oxide selected from the group consisting of Si, Sn, Zr, Mn, Ni, Fe, Ca, Ce, La, Cr, Al, Co, Sb, Bi, As, Ge, Pb, Zn, Cd, In, Ti, Cu, Bi, Mo and Ga and is preferably at least one selected from the group consisting of SiO, SnO, and $SnO_2$.

Also, in order to control the oxygen content of the metalloid oxide of the final product, if necessary, the metalloid such as the above-mentioned metalloid may be further included. In this composite of metalloid oxide and lithium, the oxygen content of the metalloid oxide is $MO_x$ (M: metalloid, $0<x=2$). When x is more than 2, since the relative amount of metalloid (M) which is the electrochemical reaction site is small, there arise problems that a reduction in the total energy density can be induced, and also the initial efficiency is lowered.

In addition, the metalloid oxide may be coated with an amorphous carbon layer. The amorphous carbon layer may be derived from an organic polymer component. Specifically, the amorphous carbon layer may be formed by heat-treating the organic polymer component.

In this case, the organic polymer component is not particularly limited as long as it is a resin that plays a role of a matrix. The organic polymer component specifically is a polymer resin that can be used as a binder material for a typical secondary battery, and representative examples of such a polymer resin may be a polymer including at least one selected from the group consisting of carboxymethyl cellulose (CMC), sucrose, polyacrylonitrile (PAN), polyvilylidenefluoride (PVDF and polyvinyl alcohol (PVA).

The amorphous carbon layer may be coated on the entire surface of the metalloid oxide or intermittently. Specifically, the amount of carbon in the amorphous carbon layer may be 2 to 30 parts by weight based on 100 parts by weight of the metalloid oxide. If the amount of carbon in the carbon layer is less than 2 parts by weight, carbon cannot be uniformly coated on the surface of the metalloid oxide particles. If the amount of carbon in the carbon layer exceeds 30 parts by weight, excessive carbon may be coated to reduce the capacity of the secondary battery. At this time, if the amount of carbon in the amorphous carbon layer exceeds 15 parts by weight based on 100 parts by weight of the metalloid oxide, the carbon layer is formed on the entire surface of the metalloid oxide. If the amount of carbon in the amorphous carbon layer is less than 15 parts by weight, a part of the surface of the metalloid oxide is intermittently coated.

In addition, the metalloid oxide may include a conductive material therein. The conductive material may be selected from the group consisting of a linear conductive material, a point conductive material, and a mixture thereof.

The linear conductive material may include at least one selected from the group consisting of carbon nanotubes, carbon nanofibers, and graphene.

Since the carbon nanotubes and the carbon nanofibers have a very high strength and a high resistance to breakage, it is possible to prevent deformation of the current collector due to repetition of the charging/discharging and external force, and since oxidation of the surface of the current collector in an abnormal battery environment such as high temperature and overcharging can be prevented, the safety of the battery can be greatly improved. Also, the graphene, which have a surface area of about 2600 $m^2/g$ and an electron mobility of 15,000 to 200,000 cm$^3$/Vs, have more useful properties than those of other carbon materials In particular, the electron transfer rate in the graphene is close to the speed of light because electrons flow in the graphene as if they have no mass. The graphene can be produced generally by a scotch tape method, an epitaxy method using a silicon carbide insulator, a chemical method using a reducing agent, and a method using a metal catalyst.

The point conductive material may include at least one selected from the group consisting of carbon black, acetylene black, Ketjen black, channel black, furnace black, lamp black, and summer black.

Although the linear conductive material and the point conductive material can be classified by the shape of the conductive material, the classification between the linear conductive material and the point conductive material in the present invention can be made by aspect ratio (length of the major axis/length of the minor axis). For example, when the aspect ratio is 1.5 or more, it may be a linear conductive material. When the aspect ratio is less than 1.5, it may be a point conductive material.

The conductive material may be selected from the group consisting of crystalline carbon, amorphous carbon, and a mixture thereof. When the conductive material is amorphous carbon, the secondary battery can have high discharge capacity and have excellent rate characteristics, while they have high irreversible capacity, low charging/discharging efficiency, and low energy density due to their low bulk density and low electrical conductivity. On the other hand, in the case of crystalline carbon, the discharge capacity of the secondary battery can be lowered, but the electric conductivity and the energy density are very excellent, and the reversibility of the charging/discharging process is relatively superior to that of the amorphous carbon. Therefore, in order to highlight the merits of each of these materials, they may be used in combination.

The content of the conductive material may be 1 to 20 wt. % based on the total weight of the metalloid oxide. When the content of the conductive material is less than 1 wt. %, the effect of the conductive material may be insignificant. When the conductive material is more than 20 wt. %, the capacity of the secondary battery may decrease.

In the present invention, the rolling process is preferably performed in an inert gas atmosphere, in which nitrogen gas, argon gas, helium gas, krypton gas, or xenon gas exists, in order to block contact with oxygen. If it comes into contact with oxygen, since the lithium source and oxygen together react with the metalloid oxide to form a lithium oxide or a lithium metal oxide, the effect of the initial efficiency improvement of the battery may be reduced.

The rolling process may also be carried out at a rolling strength of 0.05 S to 2 S, preferably 0.1 S to 1 S, more preferably 0.2 S to 0.4 S. If the rolling strength is less than the above range, the composite of lithium and the negative electrode active material may not be formed. If the rolling strength exceeds the above range, although the composite may be formed, cracks may occur.

In addition, the rolling process may be carried out at a pressing speed of 0.1 m/s to 5 m/s, preferably 0.1 m/s to 3 m/s, more preferably 0.3 to 2 m/s. If the pressing speed is less than the above range, the pressing speed is too slow to form the composite of lithium and the negative electrode active material. If the pressing speed exceeds the above range, since the pressing speed is too fast, although the composite may be formed, cracks may also occur.

The negative electrode for the lithium secondary battery according to the present invention includes the negative electrode active material layer formed on the negative electrode current collector wherein the negative electrode active material layer may include the composite of the negative electrode active material and lithium.

In the negative electrode for the lithium secondary battery according to an exemplary embodiment of the present invention, the negative electrode active material may include a silicon-based negative electrode active material. The silicon-based negative electrode active material may include, for example, at least one selected from the group consisting of Si, silicon oxide particles ($SiO_x$, $0<x\leq2$), Si-metal alloys, and alloys of Si and silicon oxide particles ($SiO_x$, $0<x\leq2$), wherein the silicon oxide particles ($SiO_x$, $0<x<2$) may be a composite composed of crystalline $SiO_2$ and amorphous Si.

Since the silicon-based negative electrode active material has a large volumetric change during the charging/discharging and a large irreversible capacity due to severe side effects during the initial charging/discharging, it is more effective due to pre-lithiation occurring when the lithium secondary battery is operated.

In addition, the negative electrode active material may comprise a carbonaceous material, lithium metal, or tin capable of absorbing and releasing lithium ion, in addition to the silicon-based negative electrode active material. As the carbonaceous material, both low crystalline carbon and highly crystalline carbon and the like can be used. Soft carbon and hard carbon are representative low-crystalline carbon. High temperature baked carbons, such as, natural graphite, kish graphite, pyrolytic carbon, mesophase pitch-based carbon fiber, meso-carbon microbeads, mesophase pitches, and petroleum or coal tar pitch derived cokes are representative low-crystalline carbon.

Lithium Secondary Battery

The present invention also provides a secondary battery comprising a negative electrode made according to the method described above, and preferably the secondary battery can provide a lithium secondary battery. The lithium secondary battery has a structure in which a non-aqueous electrolyte solution containing lithium salt is impregnated into the electrode assembly having the separator interposed between the positive electrode and the negative electrode.

The positive electrode according to the present invention may be formed in the form of a positive electrode by forming a film on a positive electrode current collector using a composition comprising a positive electrode active material, a conductive material, and a binder.

The positive electrode active material may be any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0\leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$ and $LiFePO_4$, or a mixture of two or more thereof. Also, in addition to these oxides, sulfides, selenides, halides and the like can also be used. In a more preferred embodiment, the positive electrode active material may be $LiCoO_2$ which is suitable for high power batteries.

The conductive material is a component for further improving the electrical conductivity of the positive electrode active material, and non-limiting examples thereof may be graphites such as natural graphite or artificial graphite; carbon blacks such as carbon black, acetylene black, ketjen black, channel black, furnace black, lamp black, and summer black; conductive fibers such as carbon fiber and metal fiber; metal powders such as carbon fluoride, aluminum and nickel powder; conductive whiskers such as zinc oxide and potassium titanate; conductive metal oxides such as titanium oxide; conductive materials such as polyphenylene derivatives and the like The binder is a component that maintains a positive electrode active material on a positive electrode current collector and has the function of organically connecting between positive electrode active materials, and the examples thereof may include polyvinylidene fluoride (PVDF), polyvinyl alcohol (PVA), carboxymethylcellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, styrene-butadiene rubber, fluorine rubber, and various copolymers thereof The positive electrode current collector is the same as described above with respect to the negative electrode current collector, and generally the positive electrode current collector may be an aluminum foil.

The positive electrode composition can be coated on a positive electrode current collector using conventional methods known in the art, and for example, various methods such as dipping method, spraying method, roll coat method, gravure printing method, bar coat method, die coating method, comma coating method or a combination thereof can be used.

After such a coating process, evaporation of the dispersion medium, densification of the coating film and adhesion between the coating film and the current collector take place in the positive electrode and positive electrode composition through drying process. At this time, the drying is carried out according to a conventional method and is not particularly limited.

The separator according to the present invention is not particularly limited in its material and is not particularly limited as long as it is commonly used as a separator in an electrochemical device, which physically separates a negative electrode and a positive electrode from each other and has electrolyte and ion permeability. However, it is preferable that the separator is a porous, nonconductive or insulating material, particularly a material with an excellent moisture-containing ability for the electrolyte solution along with a low resistance to the movement of ions in the electrolyte solution. For example, a polyolefin-based porous membrane or nonwoven fabric may be used, but it is not particularly limited thereto.

Examples of the polyolefin-based porous membrane may include a membrane formed by each of polyethylenes such as high density polyethylene (HDPE), low density polyethylene (LDPE), linear low density polyethylene (LLDPE) and ultrahigh molecular weight polyethylene (UHMWPE), and polyolefin-based polymer such as polypropylene, polybutylene and polypentene, etc. or a mixture of these polymers.

The nonwoven fabric may be a nonwoven fabric formed by each of, for example, polyphenylene oxide, polyimide, polyamide, polycarbonate, polyethylene terephthalate, polyethylene naphtha late, polybutylene terephthalate, polyphenylene sulfide, polyacetal, polyether sulfone, polyetheretherketone, polyester, etc., or a mixture of these polymers, in addition to the polyolefin-based nonwoven fabric described above, and these nonwoven fabric includes spunbond or meltblown form consisting of long fibers which is in the form of fibers forming a porous web.

The thickness of the separator is not particularly limited, but is preferably in the range of 1 to 100 µm, more preferably in the range of 5 to 50 µm. When the thickness of the separator is less than 1 µm, the mechanical properties cannot be maintained, and when the thickness of the separator exceeds 100 µm, the separator acts as a resistance layer, thereby deteriorating the performance of the battery.

The pore size and porosity of the separator are not particularly limited, but it is preferable that the pore size is 0.1 to 50 µm and the porosity is 10 to 95%. When the pore size of the separator is less than 0.1 µm or the porosity is less than 10%, the separator acts as a resistive layer. When the pore size of the separator exceeds 50 µm or the porosity exceeds 95%, the mechanical properties cannot be maintained.

The electrolyte applicable to the present invention may be a non-aqueous electrolyte solution, which does not react with lithium metal, or a solid electrolyte, but preferably a non-aqueous electrolyte, and the electrolyte includes an electrolyte salt and an organic solvent.

The electrolyte salt contained in the non-aqueous electrolyte solution is a lithium salt. The lithium salt can be used without limitation as long as it is commonly used in an electrolyte solution for a lithium secondary battery. For example, the anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$. or a combination of two or more of these anions.

The organic solvent contained in the non-aqueous electrolyte solution can be used without limitation as long as it is commonly used in an electrolyte solution for a lithium secondary battery, and for example, ether, esters, amide, linear carbonate, cyclic carbonate and the like may be used alone or in combination of two or more thereof. Among them, carbonate compounds which are typically cyclic carbonate, linear carbonate, or a mixture thereof may be included.

Specific example of the cyclic carbonate compound includes any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and their halide, or a mixture of two or more thereof. Example of such halides includes, but is not limited to, fluoroethylene carbonate (FEC) and the like. The fluoroethylene carbonate may be added to the electrolyte solution separately as an additive for the electrolyte solution and may improve battery performances such as initial efficiency and capacity of the battery. The content of the fluoroethylene carbonate as an additive may be 0.1 to 15 wt. % of the electrolyte solution.

Also, specific example of the linear carbonate compound may typically include, but are not limited to, any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more thereof.

Particularly, cyclic carbonates such as ethylene carbonate and propylene carbonate among the carbonate-based organic solvents are highly viscous organic solvents and have a high dielectric constant, and thus can dissociate lithium salts in the electrolyte much better. When these cyclic carbonates are mixed with linear carbonates with a low viscosity and a low dielectric constant, such as dimethyl carbonate and diethyl carbonate, at a suitable ratio, an electrolyte solution having the higher electrical conductivity can be prepared.

In addition, the ether among the above organic solvents may be, but is not limited to, any one selected from the group consisting of dimethyl ether, diethyl ether, dipropyl ether, methylethyl ether, methylpropyl ether and ethylpropyl ether, or a mixture of two or more thereof.

In addition, the ester among the above organic solvents may be, but is not limited to, any one selected from the group consisting of methyl acetate, ethyl acetate, propyl acetate, methyl propionate, ethyl propionate, propyl propionate, γ-butyrolactone, γ-valerolactone, γ-caprolactone, σσ-valerolactone and ε-caprolactone, or a mixture of two or more thereof.

The injection of the non-aqueous electrolyte solution can be performed at an appropriate stage during the manufacturing process of the electrochemical device, depending on the manufacturing process and required physical properties of the final product. That is, such injection can be carried out before assembling the electrochemical device or in the final stage of assembling the electrochemical device.

In the case of the lithium secondary battery according to the present invention, it is possible to perform laminating or stacking and folding processes of the separator and the electrode, in addition to the winding process which is a general process. In addition, the case of the battery may be cylindrical, square, pouch type, coin type, or the like.

As described above, since the lithium secondary battery according to the present invention stably exhibits excellent discharge capacity, output characteristics and capacity retention rate, it is useful in the fields of portable devices such as mobile phones, notebook computers, digital cameras, and electric vehicles such as hybrid electric vehicle (HEV).

Therefore, according to another embodiment of the present invention, a battery module including the lithium secondary battery as a unit cell, and a battery pack including the same are provided. The battery module or the battery pack may be used as a power source for any one or more medium and large-sized devices of a power tool; an electric vehicle including an electric vehicle (EV), a hybrid electric vehicle, and a plug-in hybrid electric vehicle (PHEV); or a power storage system, etc.

Hereinafter, in order to explain the present invention in detail, the present invention will be described in detail with reference to examples. However, the embodiments according to the present invention can be modified into various other forms, and the scope of the present invention should not be construed as being limited to the embodiments described below. Embodiments of the present invention are provided to more fully describe the present invention to those skilled in the art.

Example 1

(1) Formation of Negative Electrode Active Material Layer 92 wt. % of SiO, 3 wt. % of Denka black (electrical conductive material) and 3.5 wt. % of SBR (binder) as negative electrode active materials, and 1.5 wt. % of CMC (thickener) were added to water to prepare a negative electrode active material slurry. The prepared negative electrode mixture slurry was coated on one side of the copper current collector, dried and rolled, and then punched to form a negative electrode active material layer.

(2) Formation of Composite of Negative Electrode Active Material and Lithium

The lithium metal powder and the binder were mixed at a weight ratio of 85:15 and dispersed in a dispersion medium (NMP) to prepare a lithium dispersion. At this time, the dispersion medium was used in an amount of 40 wt. % based on 100 wt. % of the total weight of the lithium dispersion.

The lithium dispersion was sprayed on one side of the polyolefin transfer film and then dried to form a lithium metal powder coated surface on the one side of the transfer film.

The lithium metal powder coated surface was brought into contact with the negative electrode active material layer, and then a rolling process was performed, so that the lithium metal powder on the lithium metal powder coated surface was allowed to be transferred to the negative electrode active material layer to form a composite of lithium and SiO.

The rolling process was carried out using a roll pressing machine. The rolling strength of the rolling process using the roll pressing machine was 0.3 S, and the roller used was a straight roller of non-heating roll type having hardness HrC60. Also, the pressing speed in the rolling process was 1 m/s.

(3) Manufacturing of Lithium Secondary Battery

A coin-type half-cell were prepared by using Li metal foil (150 μm) as a counter electrode, interposing the polyolefin separator between the negative electrode and the Li metal, and then injecting the electrolyte which was prepared by dissolving 1 M $LiPF_6$ in the mixed solvent of ethylene carbonate (EC) and diethyl carbonate (DEC) in a volume ratio of 50:50.

Example 2

A negative electrode having a composite formed by lithium and SiO was prepared in the same manner as in Example 1.

Also, a lithium secondary battery was manufactured using a negative electrode having a composite formed by lithium and SiO in the same manner as in Example 1, wherein the lithium secondary battery was manufactured while changing the type of the electrolyte solution. The additive FEC (fluoroethylene carbonate) was added to the electrolyte solution of Example 1 in an amount of 10% by weight based on the total weight of the electrolyte solution to prepare the battery.

Example 3

A negative electrode and a coin-type half-cell were prepared in the same manner as in Example 1, except that the strength of the roller in the rolling process is 0.1 S.

Comparative Example 1

(1) Formation of Negative Electrode Active Material Layer 92 wt. % of SiO, 3 wt. % of Denka black (electrical conductive material) and 3.5 wt. % of SBR (binder) as negative electrode active materials, and 1.5 wt. % of CMC (thickener) were added to water to prepare a negative electrode active material slurry. The prepared negative electrode mixture slurry was coated on one side of the copper current collector, dried and rolled, and then punched to form a negative electrode active material layer.

(2) Manufacturing of Lithium Secondary Battery

A coin-type half-cell were prepared by using Li metal foil (150 μm) as a counter electrode, interposing the polyolefin separator between the negative electrode and the Li metal, and then injecting the electrolyte which was prepared by dissolving 1 M LiPF$_6$ in the mixed solvent of ethylene carbonate (EC) and diethyl carbonate (DEC) in a volume ratio of 50:50.

Comparative Example 2

A negative electrode was prepared in the same manner as in Comparative Example 1.

Also, a lithium secondary battery was prepared using the negative electrode in the same manner as in Comparative Example 1, wherein the battery was manufactured while changing the type of electrolyte solution. The additive FEC (fluoroethylene carbonate) was added to the electrolyte solution of Comparative Example 1 in an amount of 5% by weight based on the total weight of the electrolyte solution to prepare a coin-type half-cell Experimental Example 1: First Cycle Charging/Discharging Reversibility Test The coin-type half-cells prepared in Examples 1, 2 and 3 and Comparative Examples 1 and 2 were subjected to charging/discharging reversibility test using an electrochemical charge/discharge controller. During the first cycle charging, the charging was performed by applying an electric current at a current density of 0.1 C-rate up to a voltage of 0.005 V (vs. Li/Li$^+$), and during the discharging, the discharging was performed at the same current density up to a voltage of 1.5 V (vs. Li/Li$^+$). At this time, the charging capacity and the discharging capacity were measured and the ratio (discharging capacity/charging capacity×100) was calculated, and then the initial efficiency and the capacity after 100 charging/discharging (normal capacity @ 100th) are summarized and shown in Table 1 below.

TABLE 1

|  | Initial efficiency (%) | Nor. Capacity (@100$^{th}$) |
| --- | --- | --- |
| Example 1 | 95 | 85 |
| Example 2 | 97 | 90 |
| Example 3 | 93 | 80 |
| Comparative Example 1 | 73 | 65 |
| Comparative Example 2 | 73 | 67 |

Referring to Table 1, it was confirmed that the cells of the Examples are improved in initial efficiency and life characteristic as compared with the cells of the Comparative Examples.

These results are probably due to the fact that in the case of the cells of Examples, the lithium metal transferred to the negative electrode reacts with SiO to cause side reactions on negative electrode active material surface in advance and the change in volume that occurs during charging is experienced in advance, thereby making dead-Li by volumetric expansion in advance. That is, it is judged that the amount of lithium consumed by the side reaction during the first charging is reduced by experiencing the side reaction in advance, and subsequently the inserted lithium ion is almost reversibly released during the charging,

DESCRIPTION OF SYMBOLS

10: Lithium dispersion
11: Lithium metal powder coating layer
20: Transfer film
30: Metalloid oxide

The invention claimed is:

1. A method for manufacturing a negative electrode for a lithium secondary battery comprising the steps of
   i) dispersing a lithium metal powder and a binder in a dispersion medium to prepare a lithium dispersion;
   ii) coating the lithium dispersion on one side of a transfer film to form a coating layer of the lithium metal powder; and
   iii) bringing the coating layer of the lithium metal powder into contact with a negative electrode active material layer of the negative electrode, followed by rolling in an inert gas atmosphere to form a composite of lithium metal in the lithium metal powder and negative electrode active material of the negative electrode active material layer,
   wherein the negative electrode active material comprises a metalloid oxide, and in step iii), the composite formed is a composite of the lithium metal and the metalloid oxide, and wherein the metalloid oxide is SiO,
   wherein the rolling step is carried out using a roll pressing machine, and
   wherein the roll pressing machine is a straight roller of non-heating roll type having hardness HrC60.

2. The method for manufacturing the negative electrode for the lithium secondary battery according to claim 1, wherein a surface of the metalloid oxide is coated with an amorphous carbon layer.

3. The method for manufacturing the negative electrode for the lithium secondary battery according to claim 2, wherein the metalloid oxide includes a conductive material therein.

4. The method for manufacturing the negative electrode for the lithium secondary battery according to claim 1, wherein the lithium dispersion includes the lithium metal powder and the binder in a weight ratio of 70:30 to 95:5.

5. The method for manufacturing the negative electrode for the lithium secondary battery according to claim 1, wherein the dispersion medium is included in the lithium dispersion in an amount of 10 to 40 wt. % based on the total weight of the lithium dispersion.

6. The method for manufacturing the negative electrode for the lithium secondary battery according to claim 1, wherein the binder comprises at least one selected from the group consisting of polyvinylidene fluoride-co-hexafluoro propylene, polyvinylidene fluoride-co-trichloro ethylene, polyvinylidene fluoride-co-chlorotrifluoro ethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethyl pullulan, cyanoethylpolyvinylalcohol, cyanoethyl cellulose, cyanoethyl sucrose, pullulan, carboxyl methyl cellulose, acrylonitrile-styrenebutadiene copolymer, polyimide, polyvinylidene-fluoride and styrene butadiene rubber.

7. The method for manufacturing the negative electrode for the lithium secondary battery according to claim 1, wherein the dispersion medium comprises at least one selected from the group consisting of N-methyl-2-pyrrolidone, dimethylformamide, dimethyl acetamide, xylene, heptane, hexane, toluene, acetone, tetrahydrofuran, methylene chloride, chloroform, cyclohexane, dichloromethane, dimethyl sulfoxide, acetonitrile, pyridine, and amines.

8. The method for manufacturing the negative electrode for the lithium secondary battery according to claim 1, wherein the transfer film comprises at least one selected from the group consisting of polyolefin, polyvinylalcohol-based polymer, polyester, polyamide, polyimide, polycarbonate, polyphenylene ether, polyphenylene sulfide and cellulose derivative.

9. The method for manufacturing the negative electrode for the lithium secondary battery according to claim 1, wherein the coating is carried out by spray drying.

10. The method for manufacturing the negative electrode for the lithium secondary battery according to claim 1, wherein the rolling of step iii) is carried out at a pressing speed of 0.3 to 2 m/s.

11. The method for manufacturing the negative electrode for the lithium secondary battery according to claim 1, wherein the particle diameter of the lithium metal powder is from greater than 0 μm to 100 μm or less.

* * * * *